(12) United States Patent
Xue

(10) Patent No.: US 7,755,258 B2
(45) Date of Patent: Jul. 13, 2010

(54) CHARGING DEVICE AND CIRCUIT UTILIZED TO CHARGE BATTERY OF PORTABLE ELECTRONIC DEVICE INCLUDING SPIRAL SPRING TO STORE ENERGY CREATED BY PENDULUM DURING MOTION OF PORTABLE ELECTRONIC DEVICE

(75) Inventor: Kai Xue, Shenzen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 11/854,880

(22) Filed: Sep. 13, 2007

(65) Prior Publication Data

US 2008/0067976 A1 Mar. 20, 2008

(30) Foreign Application Priority Data

Sep. 14, 2006 (CN) .......................... 2006 1 0153873

(51) Int. Cl.
 *H01L 41/113* (2006.01)
(52) U.S. Cl. ..................... 310/339; 310/318; 320/123
(58) Field of Classification Search ................. 310/318, 310/339; 320/123
 See application file for complete search history.

(56) References Cited

U.S. PATENT DOCUMENTS

| | | | | | |
|---|---|---|---|---|---|
| 3,732,949 | A | * | 5/1973 | Williams | ................. 185/40 R |
| 3,861,487 | A | * | 1/1975 | Gill | ..................... 180/65.31 |
| 4,939,707 | A | | 7/1990 | Nagao | |
| 5,065,067 | A | * | 11/1991 | Todd et al. | ................... 310/339 |
| 5,880,532 | A | * | 3/1999 | Stopher | ....................... 290/1 E |
| 5,903,071 | A | * | 5/1999 | Miyasaka et al. | ............. 310/38 |
| 5,923,619 | A | * | 7/1999 | Knapen et al. | ................. 368/64 |
| 6,404,107 | B1 | * | 6/2002 | Lazarus et al. | .............. 310/328 |
| 2004/0004909 | A1 | | 1/2004 | Fujimori | |
| 2005/0197686 | A1 | * | 9/2005 | Vlad | ........................... 607/149 |
| 2005/0253486 | A1 | * | 11/2005 | Schmidt | ...................... 310/329 |
| 2008/0007141 | A1 | * | 1/2008 | Deck | .......................... 310/328 |
| 2008/0067976 | A1 | | 3/2008 | Xue | |
| 2008/0212415 | A1 | * | 9/2008 | Nagao | ......................... 368/204 |

FOREIGN PATENT DOCUMENTS

| | | |
|---|---|---|
| CN | 1514957 A | 7/2004 |
| CN | 1757831 | 10/2005 |
| CN | 2746632 | 12/2005 |

(Continued)

*Primary Examiner*—Edward Tso
*Assistant Examiner*—Manuel Hernandez
(74) *Attorney, Agent, or Firm*—Leydig, Voit & Mayer, Ltd.

(57) ABSTRACT

The present invention discloses a charging device for a portable electronic product with a charging circuit, including: a mechanical energy collecting device configured on a main body of the portable electronic product, adapted to collect and store part of mechanical energy of a user of the portable electronic product; a mechanical energy-electrical energy converting device coupled with the mechanical energy collecting device, adapted to convert mechanical energy stored by the mechanical energy collecting device into electrical energy; and a processing circuit connected between an output end of the mechanical energy-electrical energy converting device and an input end of the charging circuit of the portable electronic product, adapted to process energy output from the mechanical energy-electrical energy converting device and input processed energy to the charging circuit of the portable electronic product.

6 Claims, 4 Drawing Sheets

FOREIGN PATENT DOCUMENTS

| | | | | |
|---|---|---|---|---|
| CN | 1937304 A | | 3/2007 | |
| JP | 63234739 A | * | 9/1988 | |
| JP | 06068911 A | * | 3/1994 | |
| JP | 2001-186678 A | | 7/2001 | |
| JP | 2004052747 A | * | 2/2004 | |
| JP | 2004343991 A | * | 12/2004 | |
| WO | WO 2006082173 A1 | * | 8/2006 | |

* cited by examiner

CHARGING DEVICE AND CIRCUIT UTILIZED TO CHARGE BATTERY OF PORTABLE ELECTRONIC DEVICE INCLUDING SPIRAL SPRING TO STORE ENERGY CREATED BY PENDULUM DURING MOTION OF PORTABLE ELECTRONIC DEVICE

This application claims the benefit of CN Application No. 200610153873.1 filed on Sep. 14, 2006, titled "CHARGING DEVICE FOR PORTABLE ELECTRONIC PRODUCT WITH CHARGING CIRCUIT", which is incorporated herein by reference in its entirety.

FIELD OF THE INVENTION

The present invention relates to a charging device, in particular, to a charging device for a portable electronic product with a charging circuit, and a portable electronic device.

BACKGROUND OF THE INVENTION

The standby time or the operation time of a portable electronic product is restricted by the battery, so it is difficult to make a prolongation. Moreover, for a present portable electronic product employing a chargeable battery (such as mobile phone), when the chargeable battery is exhausted, a power supply and a dedicated charger are needed to charge the portable electronic product. When it is difficult to find the power supply, such as mountaineering and shopping, or when the charger is not brought along, the portable electronic product may not be used if the battery of the portable electronic product (especially mobile phone) is exhausted. As a result, great inconvenience will be caused to the user of the portable electronic product.

In people's daily life, the movement (such as walk) of a human body generates mechanical energy continuously. If part of the mechanical energy generated by the human body in daily movement may be converted via a device into electrical energy for a portable electronic product, the standby time or the operation time of the portable electronic product may be prolonged.

Mechanical energy collecting device is a device that may collect and make use of the mechanical energy generated by the human body in daily life. At present, one of the typical mechanical energy collecting devices is a spiral spring pendulum used in a mechanical automatic watch. In this device, a pendulum is added to a spiral spring coil of an ordinary mechanical watch. When the watch is worn on the body of the user (such as wrist), the movement of the user (such as walk and swinging movement of the arm, etc.) in daily life causes the pendulum to swing, and the spiral spring of the watch is wound automatically, so that the mechanical energy of the human body may be stored to the spiral spring and used by the watch. Therefore, the user of the mechanical automatic watch may use the watch conveniently, with no need of screwing up the spiral spring by hand everyday.

However, during the process for implementing the invention, the inventor finds that the mechanical energy stored by the mechanical energy collecting device may not be used by the portable electronic product directly; instead, the mechanical energy needs to be first converted into electrical energy.

SUMMARY OF THE INVENTION

The embodiments of the present invention provide a charging device for a portable electronic product with a charging circuit and a portable electronic device, which may convert mechanical energy into electrical energy, and charge the electrical energy into a chargeable battery of the portable electronic product, so that the stand-by time or the operation time of the portable electronic product may be prolonged.

The embodiments of the present invention are realized by the following technical solutions. A charging device for a portable electronic product with a charging circuit, includes:

a mechanical energy collecting device configured on a main body of the portable electronic product, adapted to collect and store part of mechanical energy of a user of the portable electronic product;

a mechanical energy-electrical energy converting device coupled with the mechanical energy collecting device, adapted to convert mechanical energy stored by the mechanical energy collecting device into electrical energy; and a processing circuit connected between an output end of the mechanical energy-electrical energy converting device and an input end of the charging circuit of the portable electronic product, adapted to process energy output by the mechanical energy-electrical energy converting device and input processed energy to the charging circuit of the portable electronic product.

A portable electronic device includes:

an electrical energy device, adapted to collect and store part of mechanical energy of a user of an electronic product and convert collected mechanical energy into electrical energy; and a power-supplying capacitor circuit coupled with the electrical energy device, adapted to store electrical energy generated by the electrical energy device and supply power to an operating circuit of the portable electronic device.

A portable electronic device including a power supply, wherein the power supply includes:

a mechanical energy collecting device configured on a main body of a portable electronic product, adapted to collect and store part of mechanical energy of a user of the portable electronic product;

a mechanical energy-electrical energy converting device coupled with the mechanical energy collecting device, adapted to convert mechanical energy stored by the mechanical energy collecting device into electrical energy; and a current output device, adapted to process a current output by the mechanical energy-electrical energy converting device into an input current required by the operating circuit of the portable electronic product for a normal operation.

The embodiments of the present invention have the following beneficial effects: in the embodiments of the present invention, because a mechanical energy collecting device and a mechanical energy-electrical energy converting device are configured on a portable electronic product, the mechanical energy of movement (such as walk) of the user of the portable electronic product in daily life may be collected by the mechanical energy collecting device automatically, and the collected mechanical energy may be converted into electrical energy via the mechanical energy-electrical energy converting device and input to the charging circuit of the portable electronic product. Therefore, the battery of the portable electronic product may be charged via the charging circuit of the portable electronic product, and the stand-by time of the portable electronic product may be prolonged. Further, the charging is simple and convenient because the charging device according to the embodiments of the present invention charges the battery of the portable electronic product via part of the mechanical energy of the user of the portable electronic product in daily life. Moreover, because power supply and charger of the portable electronic product are not needed, the portable electronic product may be charged via the mechanical energy of the user when it is inconvenient to use power supply or no power supply or charger are on hand. Therefore, an optional charging solution is provided to the user of the portable electronic product, and it is convenient for the user to charge the portable electronic product in special cases.

DETAILED DESCRIPTION OF THE EMBODIMENTS

As shown in FIGS. 1-5, a charging device for a portable electronic product with a charging circuit according to the embodiments of the present invention includes: mechanical energy collecting device 1 configured on a main body of a portable electronic product, adapted to collect and store part of mechanical energy of a user of the portable electronic product; mechanical energy-electrical energy converting device 2 coupled with mechanical energy collecting device 1, adapted to convert the mechanical energy stored by mechanical energy collecting device 1 into electrical energy; and processing circuit 3 connected between an output end of mechanical energy-electrical energy converting device 2 and an input end of the charging circuit of the portable electronic product (not shown), adapted to process an energy output by mechanical energy-electrical energy converting device 2 and input processed energy to the charging circuit of the portable electronic product. Therefore, the mechanical energy of the user of the portable electronic product in daily life (such as walk) may be collected by mechanical energy collecting device 1 on the main body of the portable electronic product automatically, and mechanical energy-electrical energy converting device 2 converts collected mechanical energy into electrical energy and inputs the electrical energy to the charging circuit of the portable electronic product, so that the battery of the portable electronic product may be charged via the charging circuit of the portable electronic product, and the standby time of the portable electronic product may be prolonged.

Figure 1:
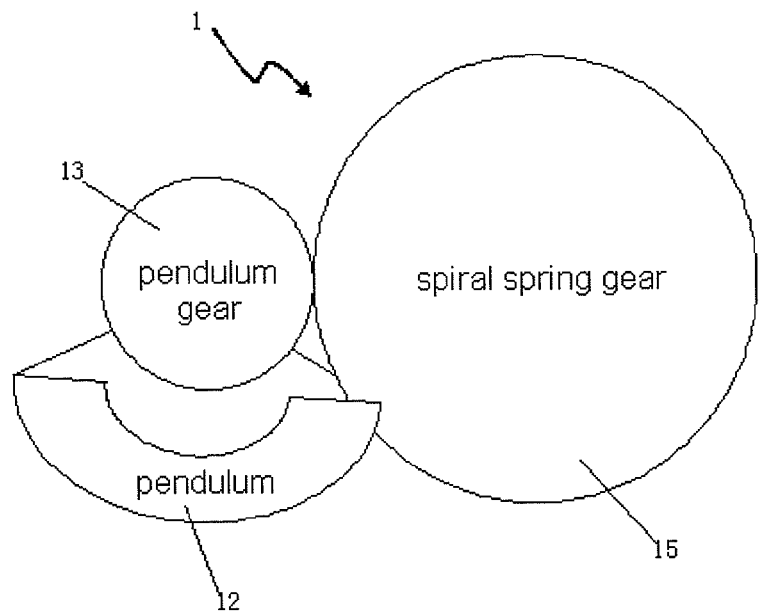
FIG. 1 is a front structural diagram of the mechanical energy collecting device according to one embodiment of the present invention.
Figure 2:
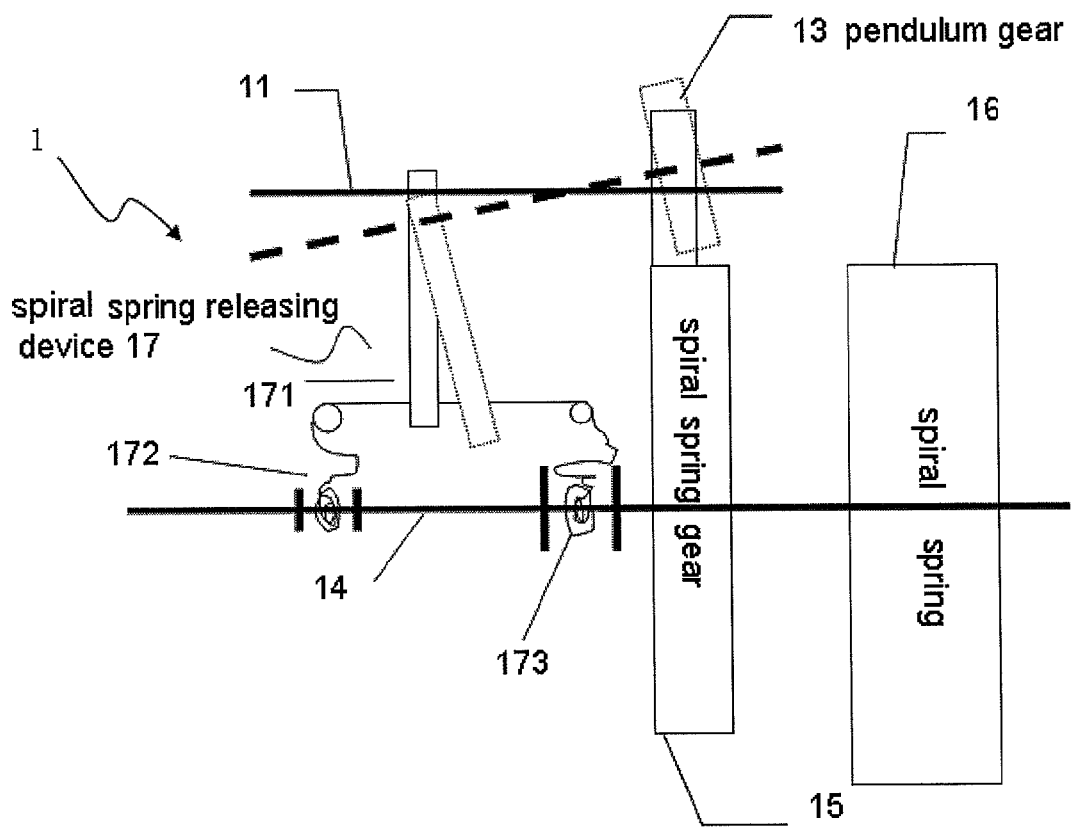
FIG. 2 is a structural diagram showing the engagement and disengagement between the spiral spring gear and the pendulum gear according to one embodiment of the present invention.
Figure 3:
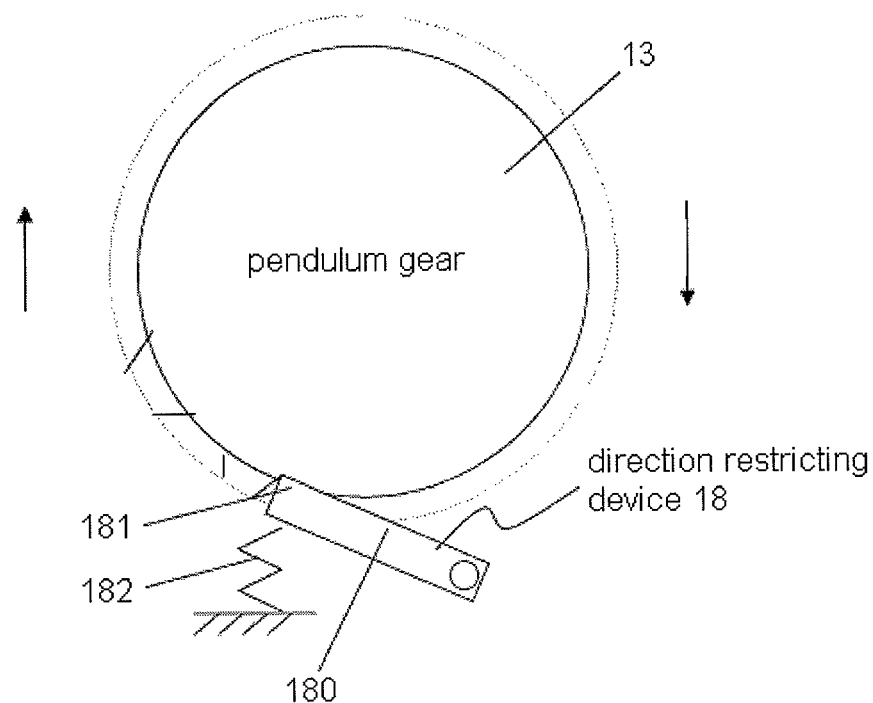
FIG. 3 is a structural diagram of the direction restricting device according to one embodiment of the present invention.

In an embodiment of the present invention shown in FIGS. 1-3, as an optional embodiment, mechanical energy collecting device 1 is a spiral spring pendulum adapted to wind a spiral spring via the swing of a pendulum. In a specific embodiment, the spiral spring pendulum includes: pendulum shaft 11, supported rotationally on the main body of the portable electronic product; pendulum 12 and pendulum gear 13, configured on pendulum shaft 11; spiral spring shaft 14, supported rotationally on the main body of the portable electronic product; spiral spring gear 15, configured on spiral spring shaft 14 and engaged with pendulum gear 13; spiral spring 16, one end being fixed on spiral spring shaft 14 and the other end being fixed on the main body of the portable electronic product; spiral spring releasing device 17 configured between spiral spring shaft 14 and pendulum shaft 11, adapted to release spiral spring 16 when spiral spring 16 is wound; and direction restricting device 18 configured on pendulum gear 13, adapted to restrict the rotation direction of pendulum gear 13 to a direction in which spiral spring 16 is wound. Therefore, in the daily life of the user of the portable electronic product (such as walk), pendulum 12 swings and hence pendulum gear 13 on pendulum shaft 11 rotates in the direction in which spiral spring 16 is wound under the restriction of direction restricting device 18, and then spiral spring gear 15 engaged with pendulum gear 13 makes spiral spring shaft 14 rotate and spiral spring 16 is wound, so that part of the mechanical energy of the user of the portable electronic product is stored in spiral spring 16. After spiral spring 16 is fully wound, spiral spring is released intensively under the action of spiral spring releasing device 17, and then the wind process is repeated.

In this embodiment, as shown in FIG. 2, spiral spring releasing device 17 particularly includes: pendulum shaft plectrum 171, configured on pendulum shaft 11 and protruding towards a direction of spiral spring shaft 14; and engagement string 172 and disengagement string 173, wound around spiral spring shaft 14 and one end of each string being connected to spiral spring shaft 14 and the other end being connected to pendulum shaft plectrum 171, in which a winding direction of disengagement string 173 on spiral spring shaft 14 is the same as that of spiral spring 16 and the length of disengagement string 173 is configured to strain pendulum plectrum 171 when spiral spring 16 is fully wound so as to disengage pendulum gear 13 with spiral spring gear 15, the winding direction of engagement string 172 is opposite to that of spiral spring 16 and the length of engagement string 172 is configured to strain pendulum plectrum 171 when spiral spring 16 is fully released so as to pull pendulum shaft 11 back to a position where pendulum gear 13 and spiral spring gear 15 are engaged. Therefore, when spiral spring 16 is wound, disengagement string 173 is wound gradually. When spiral spring 16 is fully wound, disengagement string 173 is fully wound so that pendulum plectrum 171 is pulled to disengage pendulum gear 13 and spiral spring gear 15. In other words, spiral spring 16 releases stored energy. When spiral spring 16 releases and spiral spring shaft 14 rotates, engagement string 172 connected to spiral spring shaft 14 may be wound around spiral spring shaft 14. If engagement string 172 is fully wound on, pendulum plectrum 171 may be pulled again and pendulum gear 13 and spiral spring gear 15 may be engaged again. Therefore, spiral spring 16 is wound again.

In this embodiment, as shown in FIG. 3, direction restricting device 18 is pivotally connected to the main body of the portable electronic product and end 181 resists on pressed block 180 on pendulum gear 13. The resisting direction of pressed block 180 on pendulum gear 13 makes pendulum gear 13 rotate in the direction in which the spiral spring is wound. Elastic element 182, which presses pressed block 180, is connected between pressed block 180 and the main body of the portable electronic product. Specifically, elastic element 182 may be a compression spring adapted to provide a certain pre-stressing to press pressed block 180 on pendulum gear 13.

Figure 4:
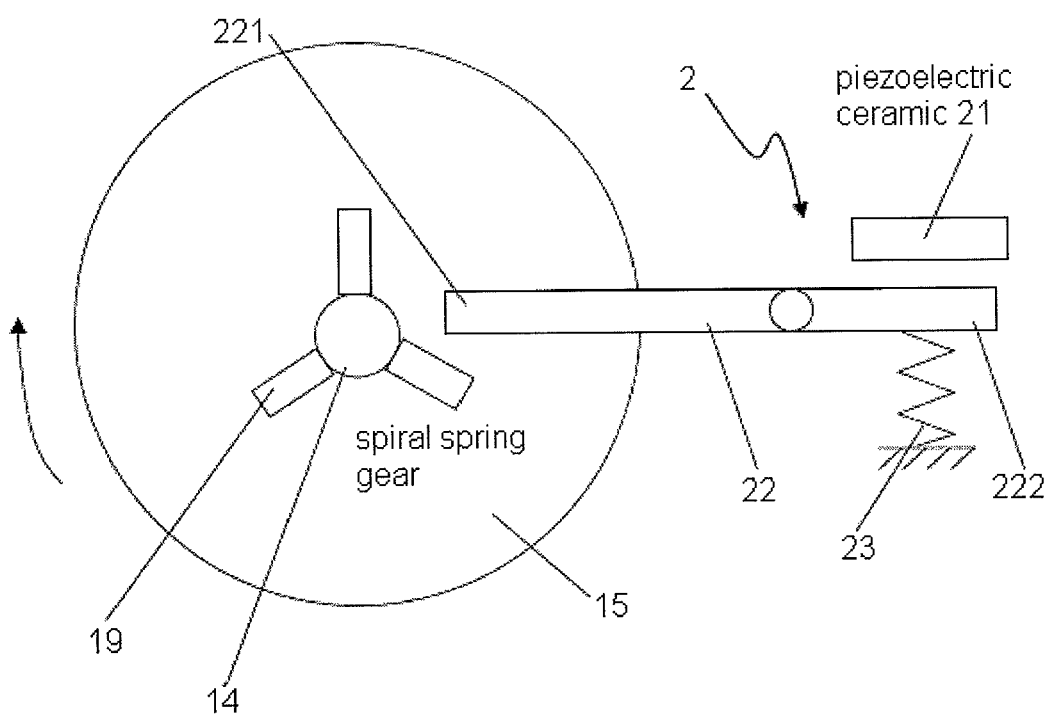
FIG. 4 is a structural diagram showing the coupling of the mechanical energy collecting device and the mechanical energy-electrical energy converting device according to one embodiment of the present invention.

Optionally, in an embodiment of the present invention, as shown in FIG. 4, mechanical energy-electrical energy converting device 2 includes piezoelectric ceramic 21, at least one plectrums 19 is fixed on spiral spring shaft 14 circumferentially, lever 22 pivotally connected on the main body of the portable electronic product is configured between plectrum 19 and piezoelectric ceramic 21, and offsetting spring 23 adapted to make lever 22 return to an initial equilibrium position is configured between lever 22 and the main body of the portable electronic product. When spiral spring shaft 14 rotates, plectrum 19 on spiral spring shaft 14 also rotates, so that one end 221 of lever 22 is poked intermittently and the other end 222 of lever 22 presses piezoelectric ceramic 21 intermittently. Hence, piezoelectric ceramic 21 generates a pulse current. Therefore, the mechanical energy collected by the spiral spring pendulum is converted into electrical energy.

In this embodiment, piezoelectric ceramic 21 may be configured on one or both sides of lever 22. FIG. 4 shows a case in which piezoelectric ceramic 21 is pressed by lever 22 intermittently when spiral spring 16 is released. When spiral spring 16 is released, spiral spring shaft 14 rotates rapidly, so that plectrum 19 on spiral spring shaft 14 pokes one end of lever 22 intermittently and the other end of lever 22 presses piezoelectric ceramic 21 intermittently. Therefore, a pulse current is generated. Because the rotating speed is high when spiral spring 16 is released, a strong pulse current may be generated and hence may be effectively used for charging the battery of the portable electronic product.

In another embodiment, piezoelectric ceramic 21 may also be located on a side opposite to the side of lever 22 shown in FIG. 4. The side of lever 22 shown in FIG. 4 is pressed intermittently by lever 22 when spiral spring 16 is wound, and piezoelectric ceramic 21 is pressed intermittently when spiral spring 16 is wound, and therefore a pulse current is generated. However, the rotating speed of spiral spring shaft 14 is low when spiral spring 16 is wound, and the pulse current generated by piezoelectric ceramic 21 is weak. Therefore, the effect on charging the battery of the portable electronic product is worse than that in the case shown in FIG. 4.

In still another embodiment, a piezoelectric ceramic may be configured on each side of lever 22 (not shown). Therefore, piezoelectric ceramic may be pressed intermittently and a pulse current is generated when spiral spring 16 is wound and released.

Figure 5:
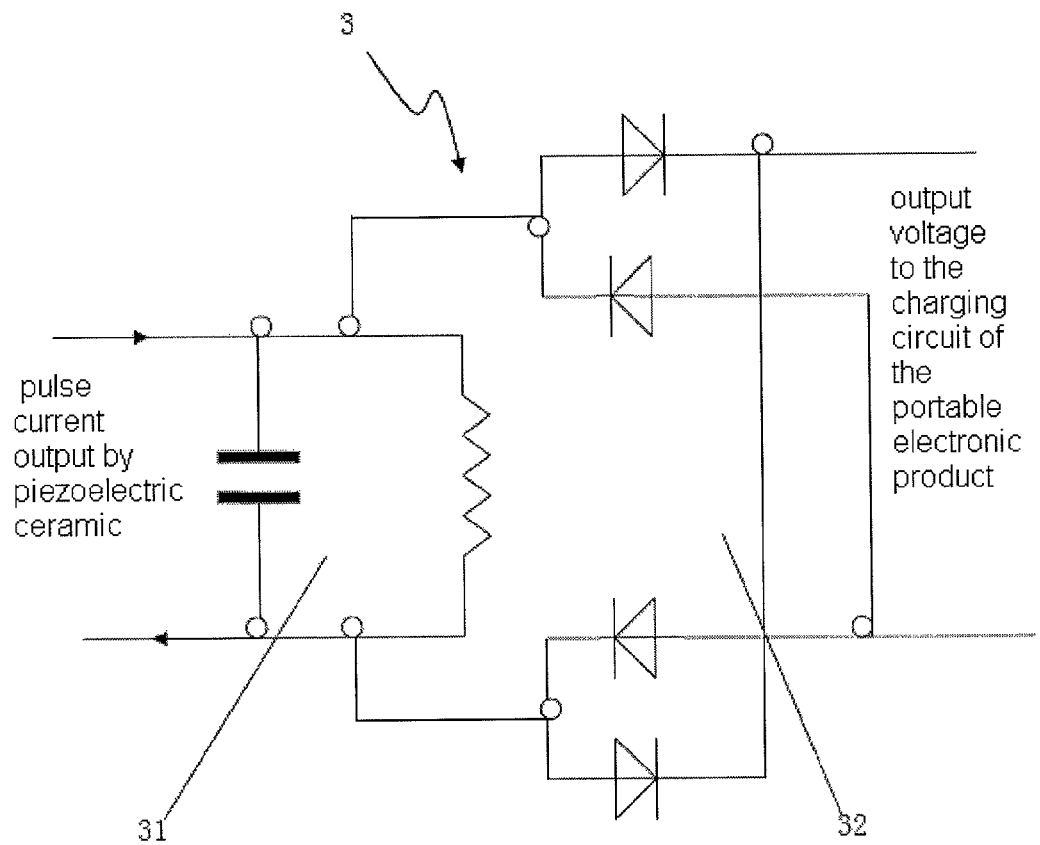
FIG. 5 is a schematic circuit diagram of the processing circuit according to one embodiment of the present invention.

It is found that the pulse current generated by piezoelectric ceramic has the following characteristics: 1) the voltage is higher than an input voltage that may be directly input to the charging circuit of the portable electronic product; 2) the pulse time is short. Therefore, the pulse current cannot be directly used to the charging circuit of the portable electronic product for charging the battery of the portable electronic product. In an embodiment of the present invention, the pulse current output by piezoelectric ceramic is processed by processing circuit 3, so that an output voltage of processing circuit 3 is converted into an input voltage for the charging circuit of the portable electronic product. In one specific embodiment as shown in FIG. 5, processing circuit 3 includes: oscillation circuit 31, adapted to convert the pulse current output by piezoelectric ceramic into an oscillating current with a longer time period; and rectification circuit 32, adapted to rectify the oscillating current output by oscillation circuit 31 and take an output voltage thereof as an input voltage of the charging circuit of the portable electronic product. Therefore, the pulse current generated by piezoelectric ceramic may be input to the charging circuit of the portable electronic product after being processed by oscillation circuit 31 and rectification circuit 32, so that the battery of the portable electronic product may be charged conveniently and the stand-by time of the portable electronic product may be prolonged.

The portable electronic product according to the embodiments of the present invention may be any portable electronic product with a charging circuit, such as mobile phone, MP3, MP4, and PDA.

Taking a mobile phone as example, with adoption of the above charging device for the portable electronic product with the charging circuit according to the embodiments of the present invention, if the mass of pendulum 12 is 5 g and each time the displacement is 2 cm, pendulum 12 experiences 4 displacements per second when the mobile phone is carried by a user, and the mobile phone is carried by the user 4 hours everyday, the total energy output by pendulum 12 is:

$$9.8*0.005*0.02*4*60*60*4=14.112J$$

If 60% of the energy output by pendulum 12 is lost; in other words, 40% of the energy output by pendulum 12 may be used by the charging circuit and charged into the battery of the mobile phone, the mobile phone may obtain energy of 5.6448 J from the movement of the user everyday.

The output voltage of lithium battery is 3.7 V, and the output current is about 0.5 mA in stand-by state. Therefore, stand-by time of 51 (=5.6448/3.7/0.0005/60) minutes may be prolonged for the mobile phone if a user carries the mobile phone for 4 hours everyday.

The whole charging device for a portable electronic product with a charging circuit according to an embodiment of the present invention adds an extra mass to the mobile phone: 5 g pendulum 12+3 g spiral spring mechanism+3 g structure=11 g.

Therefore, the stand-by time of the mobile phone may be prolonged evidently on the basis of adding the extra mass of 11 g to the mobile phone.

Further, the charging mode is simple and convenient because the charging device according to the embodiments of the present invention charges the battery of the portable electronic product via part of the mechanical energy of the user of the portable electronic product in daily life. Moreover, because the power supply and the charger are not needed, the portable electronic product may be charged via the mechanical energy of the user when it is inconvenient to use power supply or no power supply or charger is available. Therefore, an optional charging solution may be provided to the user of the portable electronic product, and it is convenient for the user to charge the portable electronic product in special cases.

Figure 6:
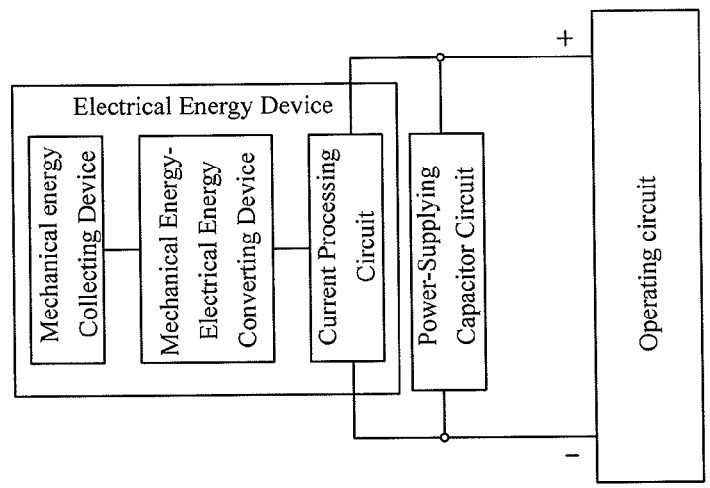
FIG. 6 is a schematic diagram of a portable electronic device according to one embodiment of the present invention.

One embodiment of the present invention further discloses a portable electronic device, as shown in FIG. 6, including:

an electrical energy device, adapted to collect and store part of mechanical energy of a user of an electronic product and convert collected mechanical energy into electrical energy; and a power-supplying capacitor circuit, coupled with the electrical energy device, adapted to store electrical energy generated by the electrical energy device and supply power to an operating circuit of the portable electronic device.

Because the capacitance of a capacitor in above power-supplying capacitor circuit is large, an intermittent current may be changed into a continuous current. Therefore, the above electrical energy device may be used as a power supply via the power-supplying capacitor circuit, and the above electrical energy device may supply power to the portable electronic device.

The above electrical energy device includes:

a mechanical energy collecting device configured on a main body of the portable electronic product, adapted to collect and store part of the mechanical energy of the user of the electronic product;

a mechanical energy-electrical energy converting device coupled with the mechanical energy collecting device, adapted to convert mechanical energy stored by the mechanical energy collecting device into electrical energy; and a processing circuit, adapted to process energy output by the mechanical energy-electrical energy converting device and input processed energy to the power-supplying capacitor circuit.

Figure 7:
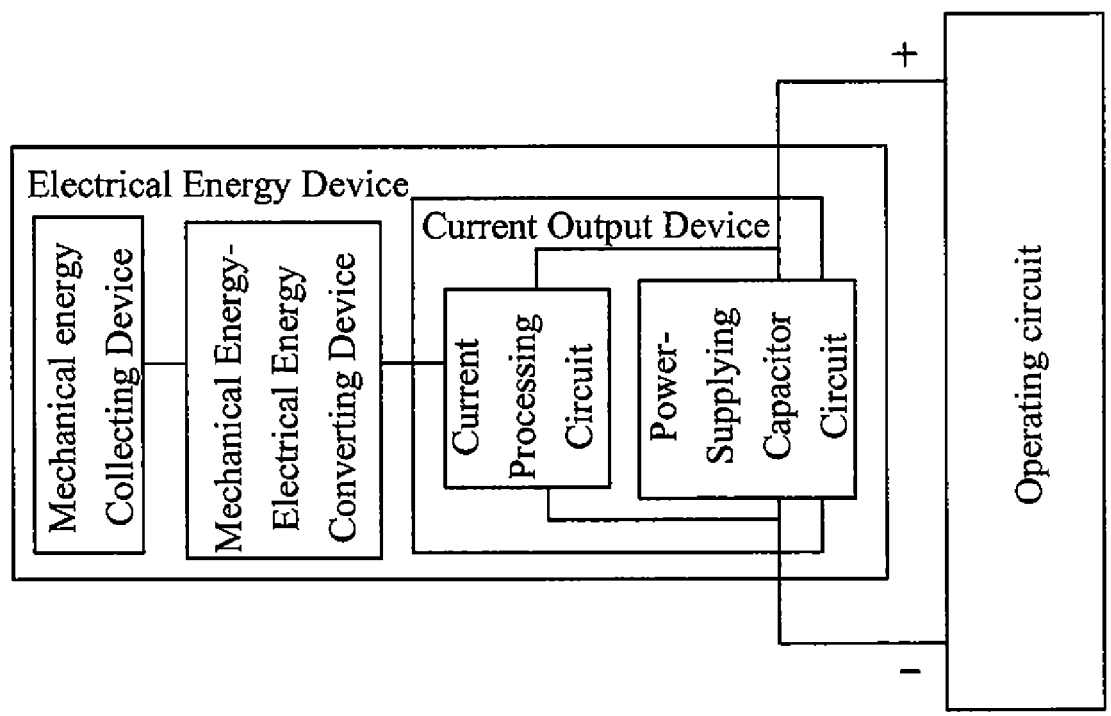
FIG. 7 is a schematic diagram of another portable electronic device according to one embodiment of the present invention.

One embodiment of the present invention further discloses a portable electronic device, as shown in FIG. 7, including a power supply, wherein, the power supply includes:

a mechanical energy collecting device configured on a main body of a portable electronic product, adapted to collect and store part of mechanical energy of a user of the portable electronic product;

a mechanical energy-electrical energy converting device coupled with the mechanical energy collecting device, adapted to convert mechanical energy stored by the mechanical energy collecting device into electrical energy; and a current output device, adapted to process a current output by the mechanical energy-electrical energy converting device into an input current required by the operating circuit of the portable electronic product for a normal operation.

The above current output device includes: a current processing circuit, adapted to transmit the current output by the mechanical energy-electrical energy converting device to a power-supplying capacitor circuit; and the power-supplying capacitor circuit coupled with the current processing circuit, adapted to store electrical energy and supply power to the operating circuit of the portable electronic device. Obviously, the above current output device may also be implemented with other structure, and the structure of the current output device is not limited hereto.

The above portable electronic device may be mobile phone, MP3, MP4 and PDA, etc.

The above are only preferred embodiments of the present invention and are not for use in limiting the present invention. Any modification, equivalent replacement or improvement made under the spirit and principles of the present invention is included in the protection scope of the present invention.

The invention claimed is:

1. A charging device for a portable electronic product with a charging circuit, comprising:
    a mechanical energy collecting device configured on a main body of a portable electronic product, adapted to collect and store part of mechanical energy of a user of the portable electronic product;
    a mechanical energy-electrical energy converting device coupled with the mechanical energy collecting device, adapted to convert mechanical energy stored by the mechanical energy collecting device into electrical energy; and
    a processing circuit connected between an output end of the mechanical energy-electrical energy converting device and an input end of a charging circuit of the portable electronic product, adapted to process energy output by the mechanical energy-electrical energy converting device and input processed energy to the charging circuit of the portable electronic product;
    wherein the mechanical energy collecting device comprises a spiral spring pendulum adapted to wind a spiral spring via a swing of the spiral spring pendulum which comprises:
    a pendulum shaft, supported rotationally on the main body of the portable electronic product;
    a pendulum and a pendulum gear, configured on the pendulum shaft;
    a spiral spring shaft, supported rotationally on the main body of the portable electronic product;
    a spiral spring gear, configured on the spiral spring shaft and engaged with the pendulum gear;
    a spiral spring, winded around the spiral spring shaft and one end being fixed on the spiral spring shaft and the other being fixed on the main body of the portable electronic product;
    a spiral spring releasing device configured between the spiral spring shaft and the pendulum shaft, adapted to release the spiral spring after the spiral spring is wound, wherein the spiral spring releasing device comprises a pendulum shaft plectrum configured on the pendulum shaft and protruding towards a direction of the spiral spring shaft, and an engagement string and a disengagement string, wound around the spiral spring shaft and one end of each string being connected to the spiral spring shaft and the other end being connected to the pendulum shaft plectrum; wherein a winding direction of the disengagement string on the spiral spring shaft is the same as that of the spiral spring, and a length of the disengagement string is configured to strain the pendulum plectrum when the spiral spring is fully wound so as to disengage the pendulum gear and the spiral spring gear, and a winding direction of the engagement string is opposite to that of the spiral spring, and a length of the engagement string is configured to strain the pendulum plectrum when the spiral spring is fully released so as to pull the pendulum shaft back to a position where the pendulum gear engages with the spiral spring gear; and
    a direction restricting device configured on the pendulum gear, adapted to restrict a rotation direction of the pendulum gear to a direction in which the spiral spring is wound.

2. The charging device for the portable electronic product with the charging circuit according to claim 1, wherein the direction restricting device comprises: a pressed block, pivotally connected to the portable electronic product and an end of the pressed block resisting on the pendulum gear, and a resisting direction of the pressed block on the pendulum gear being a direction making the pendulum gear wind the spiral spring; and an elastic element, pressing the pressed block and configured between the pressed block and the main body of the portable electronic product.

3. The charging device for the portable electronic product with the charging circuit according to claim 1, wherein the mechanical energy-electrical energy converting device comprises a piezoelectric ceramic.

4. The charging device for the portable electronic product with the charging circuit according to claim 1, wherein the processing circuit comprises:
    an oscillation circuit adapted to convert the pulse current output by the piezoelectric ceramic into an oscillating current with a longer time period; and
    a rectification circuit, adapted to rectify the oscillating current output by the oscillation circuit and output a voltage as the input voltage of the charging circuit of the portable electronic product.

5. The charging device for the portable electronic product with the charging circuit according to claim 1, wherein the portable electronic product is a mobile phone, an MP3, an MP4 or a PDA.

6. The charging device for the portable electronic product with the charging circuit according to claim 1, wherein the processing circuit comprises:

an oscillation circuit adapted to convert the pulse current output by the piezoelectric ceramic into an oscillating current with a longer time period; and a rectification circuit, adapted to rectify the oscillating current output by the oscillation circuit and output a voltage as the input voltage of the charging circuit of the portable electronic product.

\* \* \* \* \*